(12) United States Patent
Huang et al.

(10) Patent No.: US 11,483,386 B1
(45) Date of Patent: Oct. 25, 2022

(54) SELECTIVE DELETION OF SYNCHRONIZED CONTENT OBJECT COPIES BASED ON A DETECTED CHANGE

(71) Applicant: Box, Inc., Redwood City, CA (US)

(72) Inventors: Kechen Huang, Menlo Park, CA (US); Nitya Sundareswaran, Sunnyvale, CA (US); Yi Zhao, Redwood City, CA (US); Yuvnesh Modi, Burlingame, CA (US); Rena Mashintchian, Portland, OR (US); Alok Ojha, Newark, CA (US); Pal Ramanathan, Foster City, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 17/644,072

(22) Filed: Dec. 13, 2021

(51) Int. Cl.
*H04L 67/1095* (2022.01)
*H04L 9/40* (2022.01)
*H04L 67/306* (2022.01)

(52) U.S. Cl.
CPC ........ *H04L 67/1095* (2013.01); *H04L 63/102* (2013.01); *H04L 63/105* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 2016/0224430 A1* | 8/2016 | Long | G06F 16/148 |
| 2018/0198765 A1* | 7/2018 | Maybee | G06F 3/0641 |
| 2019/0324826 A1* | 10/2019 | Abuelata | G06F 3/048 |
| 2019/0332683 A1* | 10/2019 | Thummala | H04L 63/08 |
| 2020/0244756 A1* | 7/2020 | Trachy | G06F 21/64 |

OTHER PUBLICATIONS

Giorgos et al, "Multitenant Access Control for Cloud-Aware Distributed Filesystems", 2017,IEEE Transactions on Dependable and Secure Computing, vol. 16, Issue: 6, pp. 1070-1085 (Year: 2017).*

* cited by examiner

*Primary Examiner* — Davoud A Zand
(74) *Attorney, Agent, or Firm* — Vista IP Law Group, LLP

(57) ABSTRACT

A cloud-based content object management system responds to download requests from user devices to provide access to synchronization code. Using the synchronization code, a user device requests, receives, and stores a user-device-local copy of a subject content object. The cloud-based content object management system determines that at least one security-related parameter pertaining to the subject content object has undergone a change and reaches a determination that the user-device-local copy of the subject content object is to be either deleted or quarantined. Upon such determination, the cloud-based content object management system forms eviction instructions and sends them to the user device, which in turn causes deletion or quarantining of the remote content object copy at the user device, while still retaining directory structure metadata that refers to the now evicted subject content object. The subject content object stored at the cloud-based content object management system is synchronized with other user devices.

20 Claims, 9 Drawing Sheets

| Change Event | Action on Content Object at a User's Device | Action on Content Object at a Content Object Management System |
|---|---|---|
| A security label on this content object has changed such that the user should no longer have access to the content object | Cause eviction of subject content object | Retain the then-current version of the content object |
| This user's profile has changed (e.g., to a lower security clearance) | Cause eviction of subject content object | Retain the then-current content object |
| Suspicious activity by this user | Cause eviction of all content objects in the user's device | Retain the then-current content objects |
| Content object is deemed to contain malware | Cause eviction of the content object | – Retain for forensics<br>– Invoke forensics<br>– Mark as malware |
| User is excommunicated | Cause eviction of all content objects in the user's device | Mark the user as excommunicated |
| This user device is deemed compromised | Cause eviction of all content objects in the user's device | Mark the user's device as compromised |

FIG. 1B

SELECTIVE DELETION OF SYNCHRONIZED CONTENT OBJECT COPIES BASED ON A DETECTED CHANGE

TECHNICAL FIELD

This disclosure relates to collaboration systems, and more particularly to techniques for selective deletion of synchronized content object copies based on a detected change in security-related parameters.

BACKGROUND

Modern collaboration systems manage content objects that are synchronized with copies at user devices. The specific conditions for handling how a user device can access such content objects are often defined by combinations of attributes found in user profiles (e.g., user roles, security clearances, etc.) and/or in metadata (e.g., security labels or settings applied to content objects, labels pertaining to content object sensitivity, etc.).

It can happen that, at any given moment in time, there may be an event that would affect how access to the content objects is to be handled. For example, a security level on a content object might be raised in a manner that should prevent certain users who do not possess a sufficiently high security clearance level from accessing the content object.

Unfortunately, when there are copies of the content objects at user devices, it can happen that certain users who no longer possess a sufficiently high security clearance level would still have access to the content object over which the security level had been raised. This introduces risk, at least because those certain users who do not possess a sufficiently high security clearance level would still have access to the content object over which the security level had been raised. For example, they can access the content object from a local copy that was earlier synchronized.

Therefore, what is needed is a technique or techniques that address reducing risk of maintaining distributed copies of shared content objects.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for selective deletion of synchronized content object copies based on a detected change, which techniques advance the relevant technologies to address technological issues with legacy approaches. More specifically, the present disclosure describes certain techniques used in systems, methods, and in computer program products for selective deletion of synchronized content object copies based on a detected change to one or more security-related parameters. Certain embodiments are directed to technological solutions for selective deletion of synchronized content object copies based on a detected change.

The disclosed embodiments modify and improve over legacy approaches. In particular, the herein-disclosed techniques provide technical solutions that address the technical problems attendant to reducing risk of maintaining distributed copies of shared content objects. Such technical solutions involve specific implementations (e.g., data organization, data communication paths, module-to-module interrelationships, etc.) that relate to the software arts for improving computer functionality.

The ordered combination of steps of the embodiments serve in the context of practical applications that perform steps for selective deletion of synchronized content object copies based on a detected change in a collaboration system. As such, techniques for selective deletion of synchronized content object copies based on a detected change overcome long-standing yet heretofore unsolved technological problems associated with reducing risk of maintaining distributed copies of shared content objects.

Many of the herein-disclosed embodiments for selective deletion of synchronized content object copies based on a detected change are technological solutions pertaining to technological problems that arise in the hardware and software arts that underlie collaboration systems. Aspects of the present disclosure achieve performance and other improvements in peripheral technical fields including, but not limited to, distributed storage systems and malware forensics.

Some embodiments include a sequence of instructions that are stored on a non-transitory computer readable medium. Such a sequence of instructions, when stored in memory and executed by one or more processors, causes the one or more processors to perform a set of acts for selective deletion of synchronized content object copies based on a detected change.

Some embodiments include the aforementioned sequence of instructions that are stored in a memory, which memory is interfaced to one or more processors such that the one or more processors can execute the sequence of instructions to cause the one or more processors to implement acts for selective deletion of synchronized content object copies based on a detected change.

In various embodiments, any combinations of any of the above can be organized to perform any variation of acts for selective deletion of synchronized content object copies based on a detected change, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1B presents a selection of use cases as used in systems that perform selective deletion of synchronized content object copies based on a change event, according to an embodiment.

DETAILED DESCRIPTION

Figure 1A:
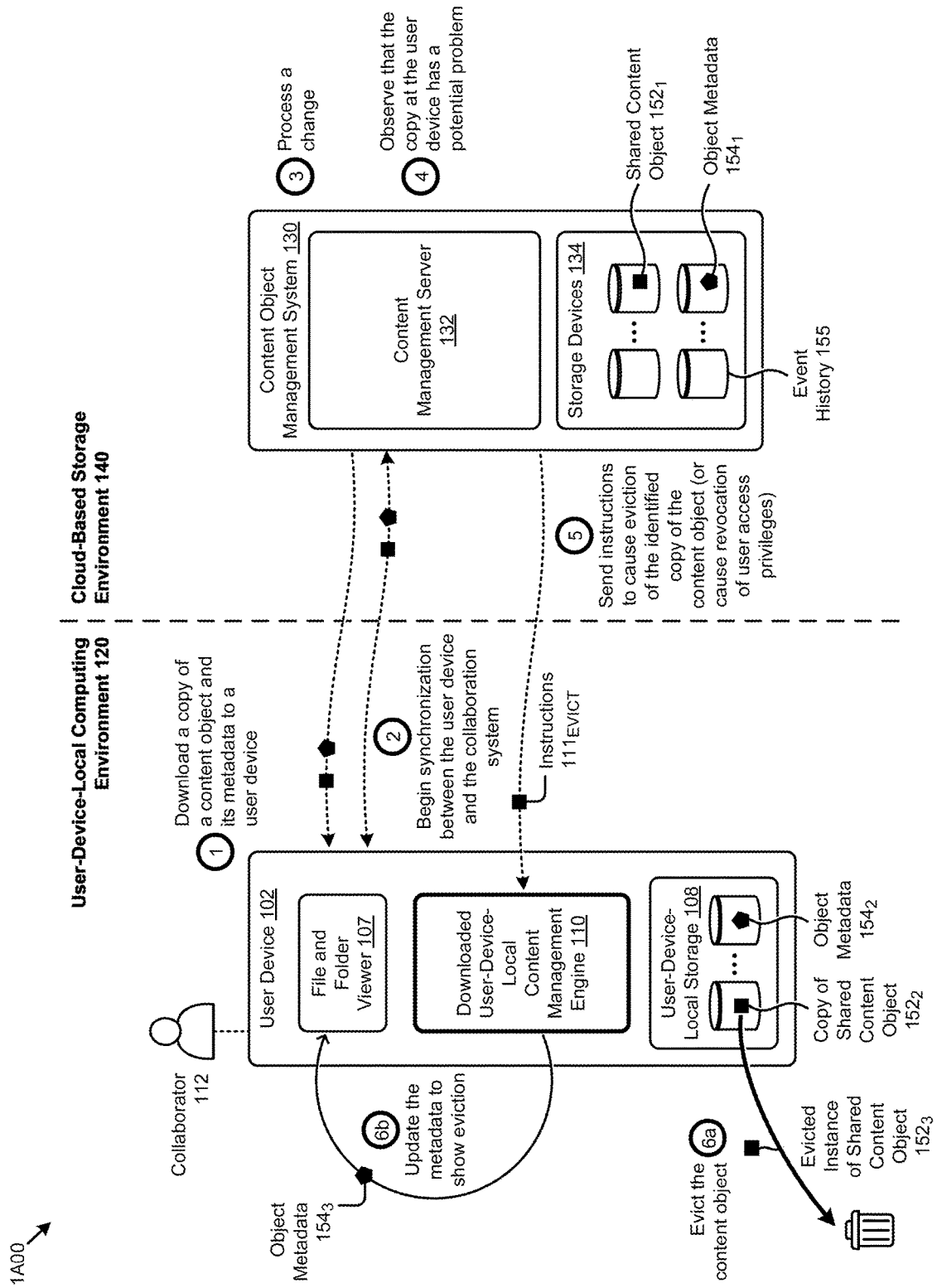
FIG. 1A exemplifies an environment in which embodiments of the disclosure can operate.

Aspects of the present disclosure solve problems associated with using computer systems for reducing risks involved in maintaining distributed copies of shared content objects. These risks are unique to, and may have been created by, various computer-implemented methods for handling distributed copies of shared content objects in the context of collaboration systems. Some embodiments are directed to approaches for selective deletion of synchronized content object copies based on a detected change. The accompanying figures and discussions herein present example environments, systems, methods, and computer program products for selective deletion of synchronized content object copies based on a detected security-related parameter change.

Overview

Disclosed herein are systems and techniques for actively managing copies (e.g., cached copies, offline copies) of documents, when the master copy of which, and/or its corresponding metadata, has been changed at the content object management system. More specifically, when such a change is made to a master copy of a content object, a change to its corresponding metadata can be applied immediately in some locations within the content object management system (e.g., in a location where a master copy is maintained), however the same cannot necessarily be said about cached copies of the content object and/or offline copies of a content object, either of which might exist in many satellite locations, possibly including on user devices.

This latter case—where offline copies of a shared content object are stored on user devices (e.g., so as to facilitate working locally on a copy of a shared content object even while the user device is not connected to the collaboration system)—present a range of security vulnerabilities. Such security vulnerabilities can be eliminated or mitigated if the content object management system is configured to be able to cause the user devices that hold respective copies of the shared content object to destroy (e.g., delete) any outdated copies of a shared content object.

Many use cases are supported whereby, when the content object management system deems that it is no longer appropriate for the user devices to maintain offline copies, those offline copies at any/all user devices that have such an offline copy can be explicitly deleted or otherwise processed so as to mitigate risks that attach, for one reason or another, to the particular offline copy. Strictly as an illustrative example, the content object management system might deem that it is no longer appropriate for the user device of a particular user to maintain an offline copy of a shared content object because the shared content object has been reclassified to a higher security level such that the users who have an offline copy should no longer be able to access the copy (although other users who do have sufficient security clearances are able to access the shared content object).

As another illustrative example, the content object management system might deem that a particular content object is no longer appropriate for the user device of a particular user to an maintain an offline copy because the content object (including any user device-resident offline copies) is deemed to contain malware. In this case, the content object management system might cause the user devices that hold respective copies of the malware-infected content object to destroy (e.g., delete) any copies from the device. Further, the content object management system might clean a malware-infected content object and use that cleaned copy to overwrite the malware-infected content object at the master site of the content object management system such that any request to access the content object is satisfied by access to the cleaned copy rather than to the malware-infected content object.

In contrast to approaches that pursue eradication of the subject content object from the content object management system, the approaches disclosed herein allow for the subject document to be retained at the content object management system so it can continue to be used within the boundaries of certain use models (e.g., retained for forensic analysis).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an environment in which embodiments of the disclosure can operate. As an option, one or more variations of environment 1A00 or any aspect thereof may be implemented in the context of the architecture and functionality of the embodiments described herein.

FIG. 1A illustrates aspects pertaining to implementing a secure container in a computing environment to hold user-device-local instances of shared content objects. Specifically, the figure presents a logical depiction of how the herein disclosed techniques can be implemented in a computing environment that comprises a cloud-based content object management system that interfaces with multiple instances of user devices to perform selective deletion of synchronized content object copies based on a change event. A representative set of high order operations are presented to illustrate how the herein disclosed techniques might be applied in computing environment 1A00.

FIG. 1A illustrates a cloud-based storage environment 140 that interfaces with a representative instance of a user device 102 in its user-device-local computing environment 120. The cloud-based storage environment 140 comprises a content object management system 130 that facilitates collaboration over large volumes of shared content by a plurality of users (e.g., collaborators). As can be observed, content object management system 130 can comprise one or more instances of a content management server 132 that maintains the shared content in cloud-based storage environment 140.

Specifically, one or more shared content objects (e.g., shared content object $152_1$) are stored in storage devices 134 at content object management system 130 and accessed by and/or collaborated over by one or more of the users. Such a shared content object might have an associated set of permissions and/or might have an associated set of security classifications that provision access to the shared content object to only a specified set of users.

A set of object metadata $154_1$ associated with a shared content object $152_1$ is also stored at storage devices 134. Object metadata $154_1$ describes certain attributes associated with shared content object $152_1$, such as a name (e.g., file name), an object identifier, a version, characteristics of the file tree nodes, characteristics of the physical storage location, access permissions, and/or other attributes. Content management server 132 uses object metadata $154_1$ and/or other information to manage access and changes to shared content objects $152_1$ by the users.

Specifically, content management server 132 has the capability of managing concurrent accesses to shared content objects by multiple users, and can resolve editing and/or versioning conflicts that might arise from the concurrent accesses.

As illustrated in FIG. 1A, a collaborator 112 might interact with a user device 102 in user-device-local computing environment 120 to access one or more of shared content objects. As earlier mentioned, access to a shared content object $152_1$ by collaborator 112 requires that user device 102 is online, which is not always feasible or efficient in terms of cost and/or time. If a user is offline or is planning to be offline, collaborator 112 might desire to have user-device-local instances of at least some of shared content objects at user device 102 so as to manage the content objects using the native capabilities of user device 102. Once back online, any changes made to these user-device-local instances can then be synchronized with instances of shared content objects at content object management system 130. However, there are no mechanisms for preventing leakage of the user-device-local instances of shared content objects to an unsecure area in the user-device-local computing environments, nor for preventing the formerly shared content objects from being further leaked (e.g., distributed maliciously, distributed unwittingly, etc.) to any number of undesired and/or unintended recipients.

The herein disclosed techniques address such problems attendant to unauthorized transfer of content objects from secure areas to unsecure areas at least in part by implementing an instance of a user-device-local content management engine 110 at the respective user devices (e.g., user device 102) of the user (e.g., collaborator 112) associated with content object management system 130. In certain embodiments, the codebase that constitutes the user-device-local content management engine 110 is provided at content object management system 130 and delivered (e.g., downloaded) to each of the user devices over the various user-device-local computing environments. Once installed at user device 102, user-device-local content management engine 110 establishes space in the user-device-local computing environment 120 to securely hold local instances of shared content objects. In some cases, a secure container is established within user-device-local storage 108 of user device 102, and access privileges are established so as to prevent unintended leakage of such user-device-local instances As can be observed in the high order operations of FIG. 1A, collaborator 112 interacts with user device 102 to issue requests to content object management system 130 to retrieve a copy of a shared content object $152_1$ (operation 1). Such a request might be issued from one or more native applications at user device 102. For example, a URL might be received in a browser (e.g., as a link in a web-based document access portal), an editor (e.g., as a link in a Word document), a file and folder viewer 107 (e.g., as a link in an Acrobat Reader document), and/or another native application (e.g., email).

The URL is then used (e.g., clicked) to issue a request (e.g., HTTP request) from user device 102 to content object management system 130 to download a particular content object. Content object management system 130 responds to the request at least in part by delivering to user device 102 instances of shared content objects and associated instances of object metadata $154_1$ (operation 1).

Once the user device 102 has its instance of a shared content object and associated instances of object metadata 1542, synchronization can begin (operation 2). As changes are made to the shared content objects, events are raised (operation 3), and the content object management system maintains an event history 155. Such an event history can be accessed at any time by any module of the content object management system. In some situations, event history 155 is accessed to identify occurrences of certain access patterns over a particular content object. Some such certain access patterns correlate to and/or are indicative of changes that at least potentially inform whether or not to evict a content object from a user device.

Downloaded instances of shared content objects (e.g., copy of shared content object 1522) and its corresponding object metadata (e.g., object metadata 1542) are securely stored in user-device-local storage 108 at user device 102. In some cases, such as when a shared content object comprises one or more embedded content objects (e.g., a Word document with an embedded Excel workbook), a plurality of content objects and sets of object metadata might be delivered by content object management system 130 for receipt by user-device-local content management engine 110, which in turn might be stored in user-device-local storage 108.

In the embodiment shown in FIG. 1A, any native application (e.g., file and folder viewer 107) might be used to perform operations over shared content objects in the user-device-local computing environment. The particular native application (e.g., file and folder viewer 107) might be selected based at least in part on the file type of the shared content object specified in the environment variables of the operating system of user device 102.

In some situations, shared content objects are made locally available at user device 102 such that manipulation by native applications can occur regardless of whether or not the user device 102 is online. As such, the user-device-local instances of shared content objects might be edited by a user (e.g., collaborator 112) while user device 102 is offline. During the time while user device 102 is offline, shared content objects at the content object management system might be undergoing edits by other users. In this case, when user device 102 is back online, the user-device-local content management engine 110 facilitates a synchronization of the local and remote instances of shared content objects and/or object metadata.

The foregoing system supports ongoing operations that initiate synchronization between a user device and a content object management system. The content object management system detects change events, observes that storage of a content object at a user device might have a potential problem (operation 4), and then sends instructions (instructions $111_{EVICT}$) to the user device (operation 5) to cause selective eviction (e.g., deletion) of synchronized content object copies based on the detected change. An operational module of the user device (e.g., user-device-local content management engine 110) processes the instructions received from the content object management system. In some cases the instructions from the content object management system indicate that the user device should evict (operation 6a) its synchronized content object copies (e.g. shared content object 1523). In some cases, and as shown, metadata stored in the user device (e.g., metadata 1543) is updated in a manner that reflects performance of the instructions (operation 6b).

As used herein, changes to security-related parameters refer to changes to a subject content object and/or changes pertaining to the environment of the user; and/or changes to the environment of user's user device; and/or its operation; and/or changes that affect privileges of the subject content object; and/or changes in networking security policies; and/or changes to a threat or risk assessment assigned to the user corresponding to the user device; and/or changes in the software and/or hardware configuration of the user device (e.g., due to a software patch or replacement, etc.); and/or changes in an authentication certificate that might be used to securely authenticate a user or user device.

The embodiment of FIG. 1A supports a wide range of use cases, some of which are shown and described as pertains to FIG. 1B.

FIG. 1B presents a selection of use cases as used in systems that perform selective deletion of synchronized content object copies based on a change event. As an option, one or more variations of use cases 1B00 or any aspect thereof may be implemented in the context of the architecture and functionality of the embodiments described herein and/or in any environment.

The figure is being presented to illustrate a range of use cases where, upon detection and classification of an event in a content object management system, any one or more of any number of synchronized content object copies can be deleted from respective user devices. More specifically, the figure is being presented to explain each of the various use cases that arise from a particular change event.

As shown, the leftmost column includes a characterization of a change event, the middle column describes actions taken by or at a user's device, and the rightmost column describes actions taken by a content object management system. Each row is illustrative of a particular use case.

One use case pertains to changes that might occur with respect to any differences between a security level on a subject content object and a security level grant to a particular user. More specifically, and as depicted in the first row, if the change event corresponds to a change of a security label on a particular subject content object, and that change (e.g., an elevation of the security level) was such that the particular user should no longer have access to that subject content object (e.g., based on that particular user's security clearance), then the copy of the subject content object at the user's device is evicted such that the user can no longer access that copy. The shared subject content object at the content object management system, however, is retained.

Other users whose security clearance is sufficiently high to be able to access the subject content object can still access it. At some moment in time, if the particular user whose copy of the subject content object was evicted requests access to that shared content object again, then the request would be satisfied (or denied) based on a comparison of the then current security clearance of the user and the then-current security classification of the requested content object.

As another use case example, there might be a change to a user's profile, which change has the effect of lowering that user's security clearance. In such a case, it might be that a previously downloaded shared content object (e.g., one with a high security level designation) that is now resident in user-device-local storage should no longer be accessible by that user. In such a case, the content object management system generates eviction instructions to cause that user's user device to evict the previously downloaded shared content object.

The content object management system is able to process a vast amount of information from many sources. As such, the content object management system can make a determination that some particular activity or series of activities (e.g., massive downloads) corresponds to suspicious behavior. More specifically, the content object management system might deem that some set of access events (e.g., uploads, downloads, mass copies, etc.) are suspicious. Then, depending on various factors such as the nature of the access events, the type of documents being accessed, the certainty that the activities are indeed suspicious, and the assessed security of the user device and/or its environment, the content object management system might send eviction instructions to the user device, which eviction instructions may cause eviction of all of the content objects at the user device. It should be noted that even though such eviction instructions may cause eviction of all of the content objects at the user device, the content object stored at the content object management system is retained and subjected to ongoing collaboration activities with other users.

Further details regarding general approaches for identifying suspicious activities are described in U.S. application Ser. No. 16/948,779 titled "DETECTING ANOMALOUS DOWNLOADS" filed on Sep. 30, 2020, which is hereby incorporated by reference in its entirety.

Yet another use case addresses the situation where the content object management system determines that a particular shared content object has been infected by malware. In this situation, all user devices that have a user-device-local copy of that infected shared content object should receive instructions to evict their respective user-device-local copy. The infected content object stored at the content object management system however can be marked as malware, and quarantined or otherwise retained within in a limited use boundary. Forensics, either computer-aided or human-aided, can be invoked. In some cases a limited use boundary that limits access to the infected content object or any copies therefrom includes an area that is logically and/or physically separate from the storage of content objects of the collaboration system where the infected content object was previously stored.

In still another use case, it might happen that the content object management system determines that the particular user is a threat—so much of a threat such that the particular user should be completely withdrawn (e.g., excommunicated) from interaction with the content object management system. In such a case, all of the contents under control of the downloaded user-device-local content management engine is removed (e.g., deleted, trashed, wiped, etc.). Further, the code that comprises the downloaded user-device-local content management engine is also removed such that the withdrawn user can no longer interact with the downloaded user-device-local content management engine and/or the content object management system. Moreover, the content object management system marks the user as being withdrawn, and all access privileges of this user are revoked.

There can be various degrees of threats posed by users. In some cases, the threat might be deemed to be more substantially related to the environment (e.g., insecure Internet communication environment) rather than to the user or user's behavior. In such a situation, rather than completely removing all of the contents under control of the downloaded user-device-local content management engine is evicted, it might happen that privileges that apply to the contents under control of the downloaded user-device-local content management engine are temporarily revoked (e.g., until such time as the threat related to the environment has been remediated).

Additionally, or alternatively, it might happen that even when all or portions of the contents under control of the downloaded user-device-local content management engine have been evicted, the downloaded user-device-local content management engine itself is not deleted. As such, metadata pertaining to the evicted content objects may remain intact such that when the transient period closes (e.g., the user moves to a sufficiently secure Internet communication environment), then the downloaded user-device-local content management engine can contact the content object management system to again request access to the content objects that had been evicted.

In some cases, a particular user device can be deemed to have been compromised. In such a situation, the content object management system marks the user as being compromised, and all of the contents under control of the downloaded user-device-local content management engine is evicted. The downloaded user-device-local content management engine is presented a security challenge (e.g., a multi-factor authentication). In this situation, even though the user's device is deemed to be compromised, at least some of the metadata pertaining to the evicted content objects may remain intact such that when the security challenge is successfully surmounted (e.g., the user's credentials are authenticated), then the downloaded user-device-local content management engine can contact the content object management system with confirmed credentials to again request access to content objects (e.g., to request access to the then-current version of the content object that had been evicted).

As can be seen from the use cases above, the cloud-based content object management system is able to detect changes that occur over a wide range of security-related parameters. Such changes to security-related parameters may pertain to specific content objects and/or may pertain to users who access such specific content objects. Moreover, the cloud-based content object management system is able to reach a determination that, based at least in part on the detected change, that remote content object copy that is stored at the user device is to be either deleted or quarantined. When such a determination is made, then the cloud-based content object management system generates eviction instructions to causes eviction of specific content objects from user devices.

As such, the risks that derive from the presence of a content object at a user device under conditions when the content object should not be available at the user device are mitigated. This risk mitigations is shown and described as pertains to FIG. 1C and FIG. 1D.

Figure 1C:
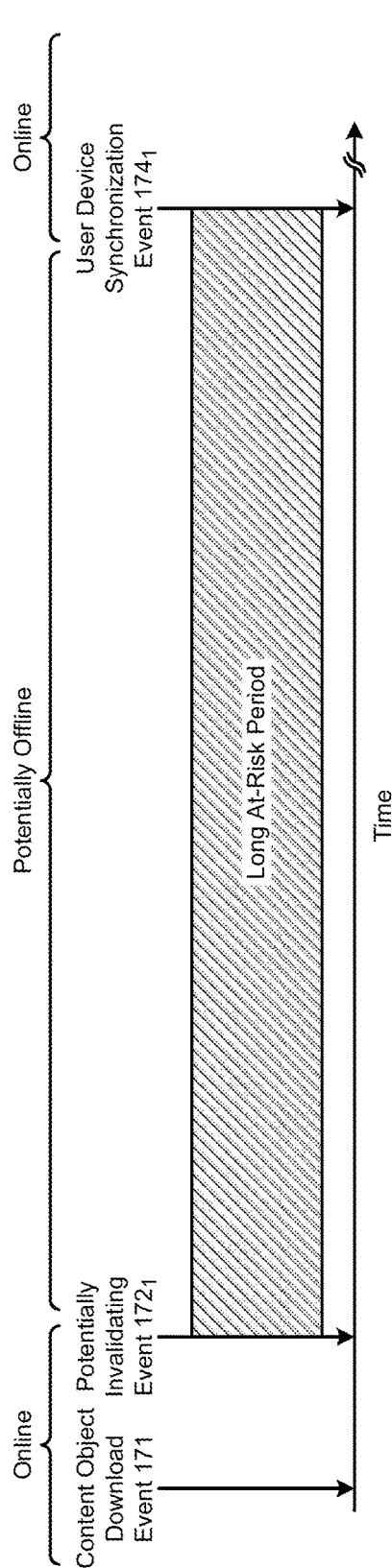
FIG. 1C illustrates a long at-risk period that can be reduced by selectively deleting synchronized content object copies in response to classification of a change event, according to an embodiment.
Figure 1D:
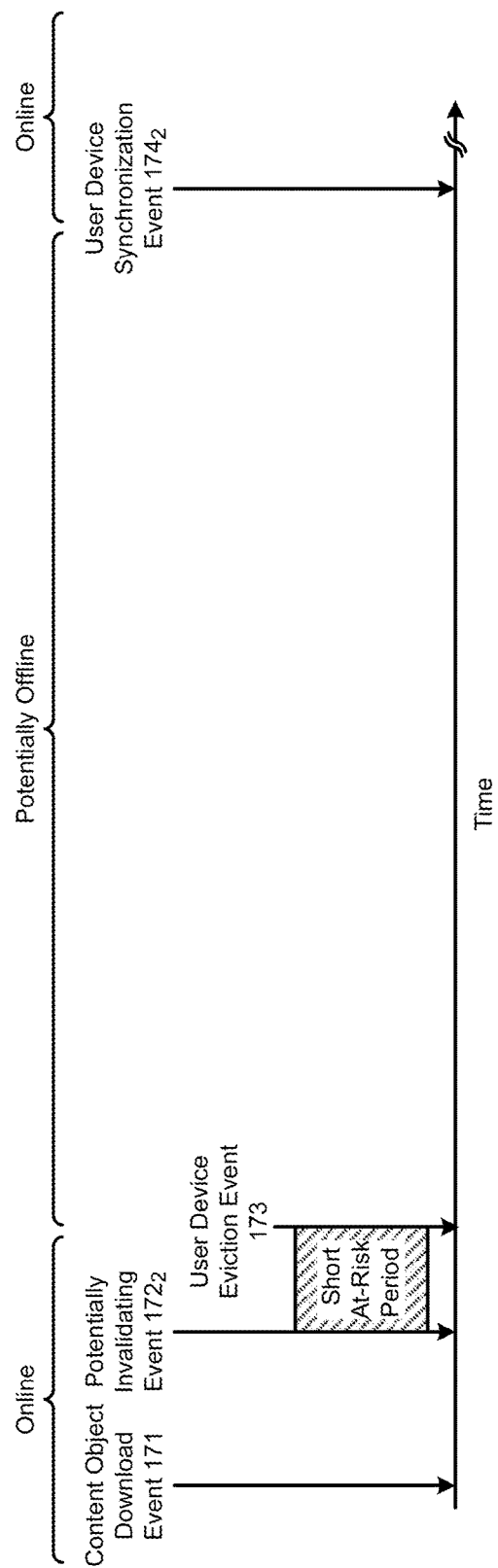
FIG. 1D illustrates a short at-risk period that accrues when selectively deleting synchronized content object copies in response to classification of a change event, according to an embodiment.

FIG. 1C illustrates a long at-risk period that can be reduced by selectively deleting synchronized content object copies in response to classification of a change event whereas FIG. 1D illustrates a short at-risk period that accrues when selectively deleting synchronized content object copies in response to classification of a change event.

FIG. 1C and FIG. 1D are being presented to illustrate some of the differences that emerge from practice of the invention. Specifically, the figures in combination compare a long at risk period (e.g., between a potentially invalidating event $172_1$ and a user device synchronization event $174_1$) with a short at risk period (e.g., between a potentially invalidating event $172_2$ and a user device synchronization event $174_2$). In both scenarios of FIG. 1C and FIG. 1D, there is an occurrence of an action to content object download event 171, followed by a potentially invalidating event. Such a potentially invalidating event can correspond to any of the foregoing use cases. As shown by visual comparison of FIG. 1C to FIG. 1D, the at risk period is made much shorter (e.g., as depicted in FIG. 1D) when there is a user device eviction event 173.

To further explain, in absence of user device eviction event of FIG. 1D, and during the long at risk period of FIG. 1C, the user could, whether maliciously or not, be exposed to (or expose) material that the user should not be able to access.

Figure 2:
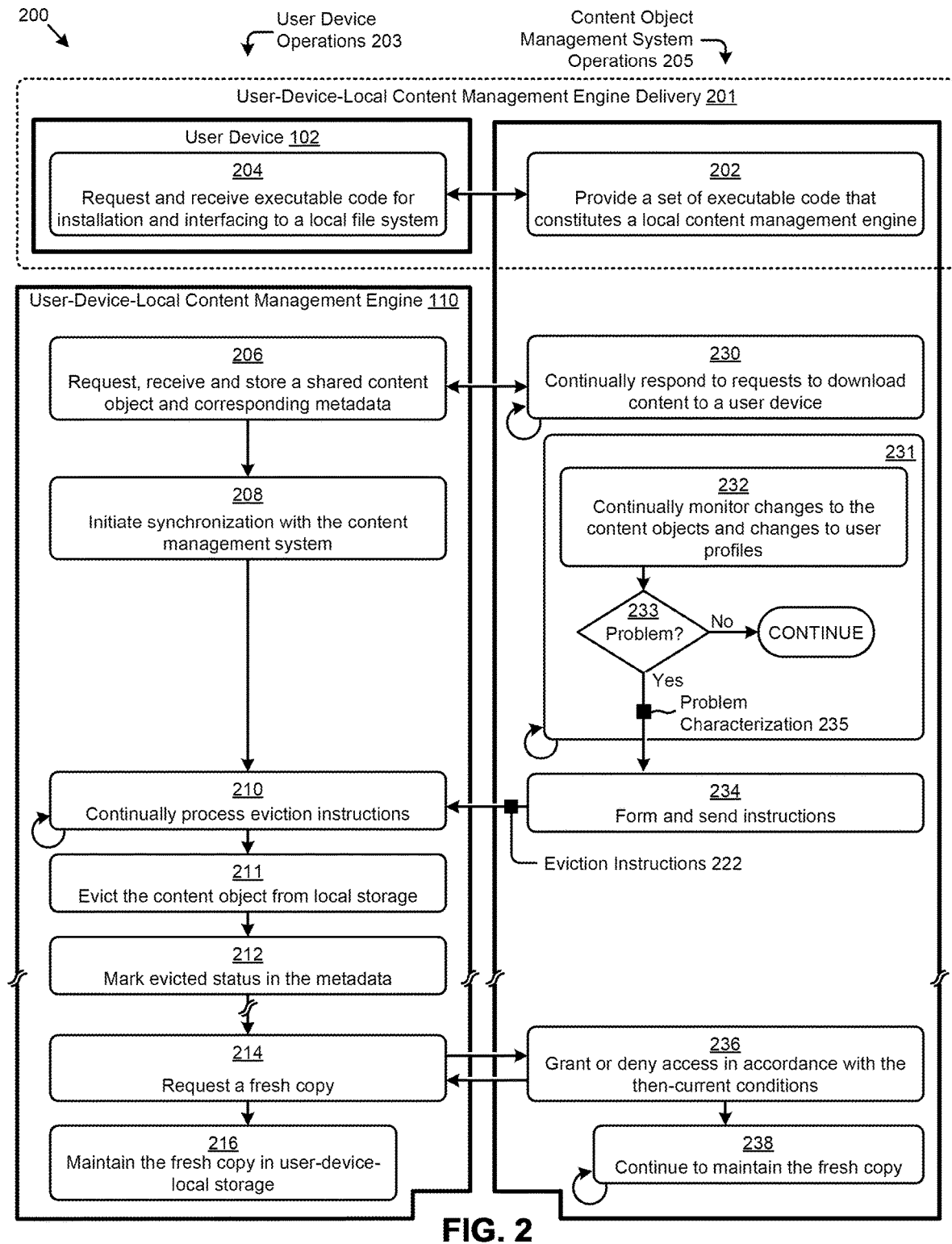
FIG. 2 exemplifies a protocol as used in systems that perform selective deletion of synchronized content object copies based on a change event, according to an embodiment.

Various embodiments that implement eviction of content objects from a user device in response to a content object management system's detection of security-related change events are shown and discussed as pertains to FIG. 2.

FIG. 2 exemplifies a protocol as used in systems that perform selective deletion of synchronized content object copies based on a change event. As an option, one or more variations of protocol 200 or any aspect thereof may be implemented in the context of the architecture and functionality of the embodiments described herein and/or in any environment.

The figure is being presented to illustrate one possible operational scenario where a series of user device operation 203 and corresponding content object management system operations 205 operate cooperatively to implement a protocol.

The top portion of the figure depicts one possible mechanism for user-device-local content management engine delivery 201. Specifically, and as shown, a particular user device 102 requests and receives (step 204) a set of executable code that constitutes a user-device-local content management engine. This executable code implements all or a portion of the user-device-local content management engine is provided by the content management server (step 202) after which the executable code is installed and initialized at the user device. Thenceforth, the user device is able to communicate with the content object management server by running the executable code that constitutes the user-device-local content management engine.

Examples of ongoing flows performed at the user device are depicted by step 206 through step 216. Strictly as one example, Once installed onto the user device, the user-device-local content management engine, possibly under direction by a user, may request and receive a shared content object and at least an initial set of corresponding metadata (step 206). Continual, ongoing synchronization of changes to this shared content object is then initiated (step 208). As such, while this continual, ongoing synchronization of changes to this shared content object are being carried out, it can happen that a change made at the user device is communicated to (e.g., synchronized with) the content object management server. Similarly, while this continual, ongoing synchronization of changes to this shared content object are being carried out, it can happen that a change that happens in the content object management system is communicated to the user device.

In some scenarios, and as shown, there might be a change that happens in the content object management system where the change is of a nature that the user-device-local content management engine should self-evict some content object and/or other user-device-local components. To accommodate such a scenario, the device-local content management engine 110 continually listens for and processes (step 210) instructions (e.g., eviction instructions 222) as may be sent by the content management server. Responsive to receipt of such eviction instructions, step 211 serves to evict the content object from the device's local storage. Further, and also to receipt of such eviction instructions, step 212 marks the metadata of the content object as being evicted. It should be noted that in this scenario, the metadata for the content object is retained. This is because it might happen that a threat or perceived threat might be transient, and as such, it might be that at some later time (e.g., when the user device begins communicating with the content object management system over a secure Internet connection) the threat is mitigated or eliminated. To accommodate such a scenario, the user device might request a fresh copy (step 214). If the request is satisfied (e.g., based on allow/deny processing of step 236), the fresh copy is maintained in user-device-local storage (step 216) as well as in the content object management system (step 238).

Now, returning to the discussion of step 210, where the user device, specifically where the user-device-local content management engine 110 continually processes eviction instructions, such eviction instructions can be formed and sent to the user-device-local content management engine at any moment in time.

As shown in this example, step 230 and step 231 operate continually. Strictly as an example that comports with the shown protocol 200, the content management server 132 continually responds to requests for download of content (step 230) to the user device. Concurrently, step 231 serves to continually monitor and assess various changes that are occurring in the content object management system (step 232). Not all detected changes that are occurring in the content object management system present a problem that could be addressed by sending eviction instructions. Therefore, decision 233 serves to assess if the detected problem is one that should be addressed by sending eviction instructions. If not, then the "No" branch of decision 233 is taken. Otherwise, if it is deemed that the detected problem is one that should be addressed by sending eviction instructions to a user device, then the "Yes" branch of decision 233 is taken, and attributes of the detected problem (problem characterization 235) is provided to downstream processing (e.g., step 234), whereafter instructions are prepared and sent to the user device.

As previously indicated, many change events are of a nature that can be addressed by sending eviction instructions to a user device. One class of change events pertain to changes that happen over a shared content object (e.g., as a result of any user on any device making a synchronized change to a content object). However there are other classes of change events that might can be addressed by sending eviction instructions to a user device. Strictly as one example, there might be a change to a user's profile, which change has the effect of lowering that user's security clearance. In such a case, it might be that a previously downloaded shared content object (e.g., one with a high security level designation) that is now resident in the user-device-local storage should no longer be accessible by that user. In such a case, instructions (e.g., eviction instructions 222) are sent (step 234) to that user's user device so as to evict the previously downloaded shared content object.

As discussed above with respect step 231 to continually monitor and assess various changes that are occurring in the content object management system, various embodiments process such changes differently based on the nature of the change and/or other then-present conditions. For example, under a first set of conditions, the content object management system may perform a first set of actions in response to a first type of change event, whereas under a different set of conditions, the content object management system may perform a different set of actions in response to a different type of change event. One possible technique for processing a change event is shown and described as pertains to FIG. 3.

Figure 3:
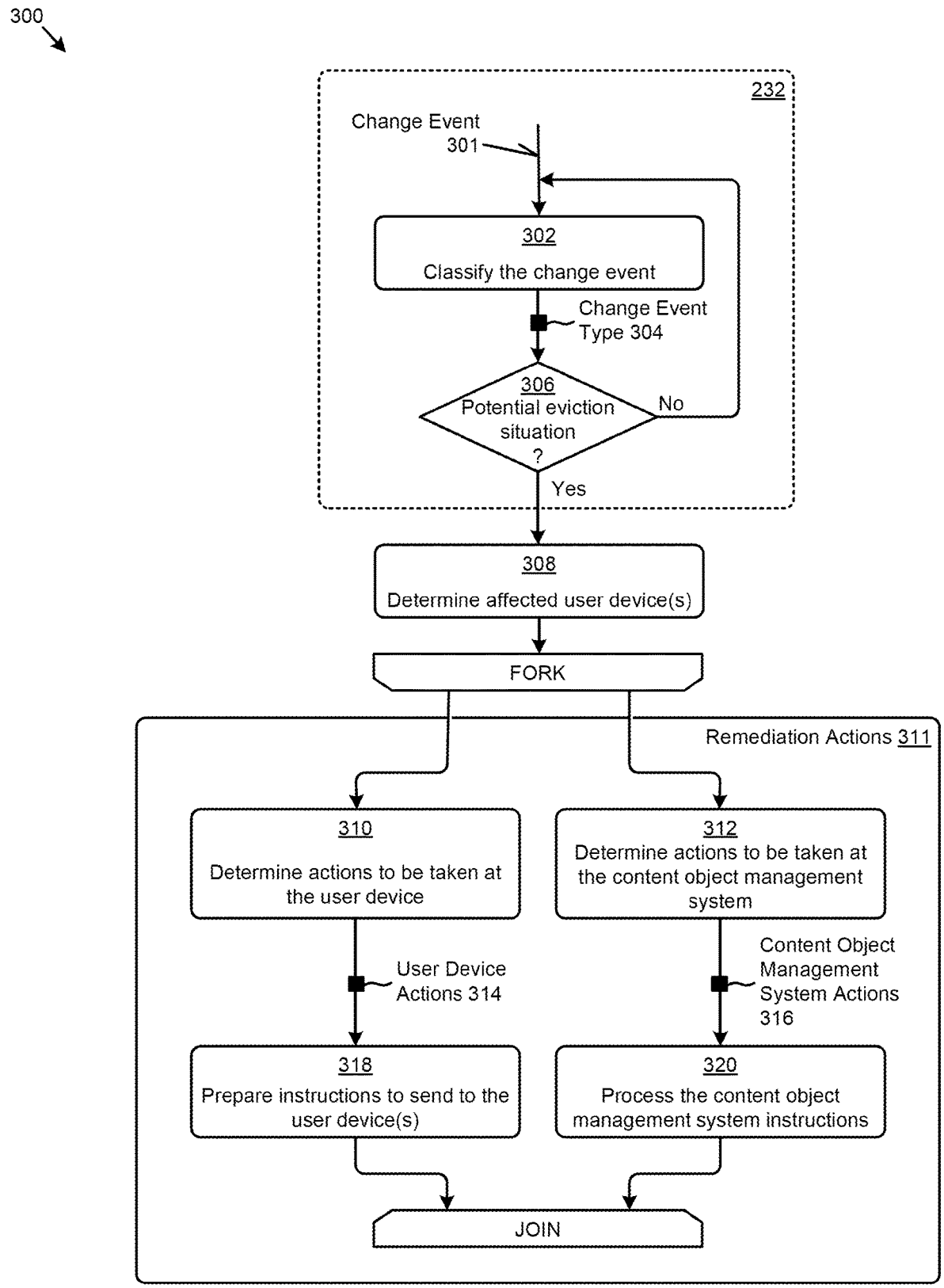
FIG. 3 depicts a processing flow whereby a user device and a content object management system perform respective actions in response to a detected change event, according to an embodiment.

FIG. 3 depicts a processing flow whereby a user device and a content object management system perform respective actions in response to a detected change event. As an option, one or more variations of processing flow 300 or any aspect thereof may be implemented in the context of the architecture and functionality of the embodiments described herein and/or in any environment.

The figure is being presented to illustrate how a detected event (e.g., change event 301) can be processed so as to determine what actions are to be caused at the content object management system (e.g., content object management system actions 316) and what actions are to be caused at any one or more user devices (e.g., user device actions 314). The flow covers a wide range of possible scenarios, some of which are discussed in detail as follows.

Upon occurrence of change event 301, step 302 serves to classify the change event. As previously indicated, there can be many type of change events over many shared documents and/or many change events over many user profiles, etc. Accordingly, incoming events are initially classified, at least to determine a change event type 304. A change event type, plus any additional information about the event and/or conditions at the time of the event, and/or conditions that are then-current as of the time of execution of step 302, are analyzed. Results of such an analysis may inform decision 306, which determines whether the change event corresponds to a potential eviction situation. If not, then the "No" branch of decision 306 is taken and another incoming event is processed upon receipt. Otherwise, when results of the analysis yields that the change event corresponds to at least a potential eviction situation, the "Yes" branch of decision 306 is taken to enter step 308. Step 308 serves to determine which users and/or their user devices might be affected.

In some cases, the change event itself can inform which users and/or their user devices might be affected. For example, if a change event pertains to a shared content object that has been downloaded by only one user to only one user device, then it might be that only that one user device is affected by the change event. On the other hand, there may be many change events that are of a nature such that many user devices should receive eviction instructions. For example, if a particular shared content object had been deemed to be infected by malware, then all user devices that have a device-local copy of that shared content object should receive instructions to evict their respective device-local copy of the infected shared content object. This can be accomplished by causing the content object management system to form eviction instructions that are in turn broadcast to all devices that at least potentially have a device-local copy of the particular shared content object.

In some embodiments, the determination that a particular shared content object is infected can be made solely by the content object management system. In other embodiments, the determination that a particular shared content object is infected can be made solely by a particular user device. In still other embodiments, the determination that a particular shared content object is infected can be made jointly and cooperatively as between a particular user device and the content object management system.

As another scenario that pertains to a particular change event type, it can happen that user privileges corresponding to various user-initiated actions (e.g., PREVIEW, EDIT, DOWNLOAD) are revoked or otherwise changed in a manner that affects the ability for that user to perform certain operations on a particular shared content object. Indeed, there are certain changes in user privileges that at least potentially invalidate user access to that particular shared content object. In such situations, the device-local copy of that shared content object is at least potentially subject to eviction from the user's user device.

As yet another scenario that pertains to a particular change event type, it can happen that a security label on a shared content object is changed in a manner that at least potentially invalidates user access to the information in that shared content object. Accordingly, all device-local copies of that shared content object are at least potentially subject to eviction from respective user devices. In some embodiments, the content object management system determines which users are affected, and from that, which user devices are affected—since a single user might have multiple user devices—and from that, what instructions need to be broadcast to which user devices.

Additionally, or alternatively, content object event history (e.g., event history 155 of FIG. 1A) can be accessed and analyzed, which analysis might reveal that a security designation (e.g., a security label) had changed during the time that the user device was offline. In certain situations it can happen that the particular pattern of entries in the content object event history indicates that a particular content object had been detected as being malware and, as such, now has been labeled as malware.

As can be seen from the foregoing, there are many different scenarios where step 308 determines different sets of user devices that are in turn at least potential candidates to receive instructions (eviction instructions) that are to be processed at the respective user devices. As shown, after determining the affected user devices, the flow forks into two concurrently running paths. A first path is configured to determine actions to be caused at the user devices (step 310). A second path is configured to determine actions that are to be taken at the content object management system (step 312).

More specifically, the content object management system can marshal itself to self-prescribe actions to be taken (e.g., user device actions 314 and/or content object management system actions 316) based on the then-current conditions that are presented at the time of, or in response to, the change event. Such marshaling is shown in FIG. 3 as remediation actions 311. Remediation actions include actions to be taken at the user device (e.g., user device actions 314) and actions to be taken by the content object management system itself (e.g., content object management system actions 316). In the shown embodiment, actions to be taken at the user device are determined at step 310, whereas actions to be taken by the content object management system itself are determined at step 312. In response to the determination (e.g., from step 310) of the user device actions 314, step 318 is carried out by the content object management system to prepare instructions that are in turn sent to a particular user device or to particular user devices. Similarly, in response to the determination (e.g., from step 312) of the content object management system actions 316, step 320 is carried out by the content object management system to process the content object management system actions 316.

In some embodiments, the user device actions 314 carry command semantics such as "Evict document X", whereas in other embodiments, the user device actions 314 carry logical semantics such as "If the device is running an operating system version earlier than 1.2.3.4.5, then evict document X". In one specific case, the semantics of the instructions sent to the user device(s) pertain to characteristics of the downloaded user-device-local content management engine, and as such the eviction instruction might carry logical semantics such as "If the user-device-local content management engine is running a version earlier than 2.3.4.5.6, then evict document X".

There are many use cases that can be addressed by the foregoing remediation actions 311. Moreover remediation in many of such use cases rely, at least in part, on cooperation between a content object management system and any number of affected user devices. Strictly as examples of such cooperation, FIG. 4A presents a malware-handling protocol between a content object management system and affected user devices, and FIG. 4B presents an access level enforcement protocol between the content object management system and affected user devices.

Figure 4:
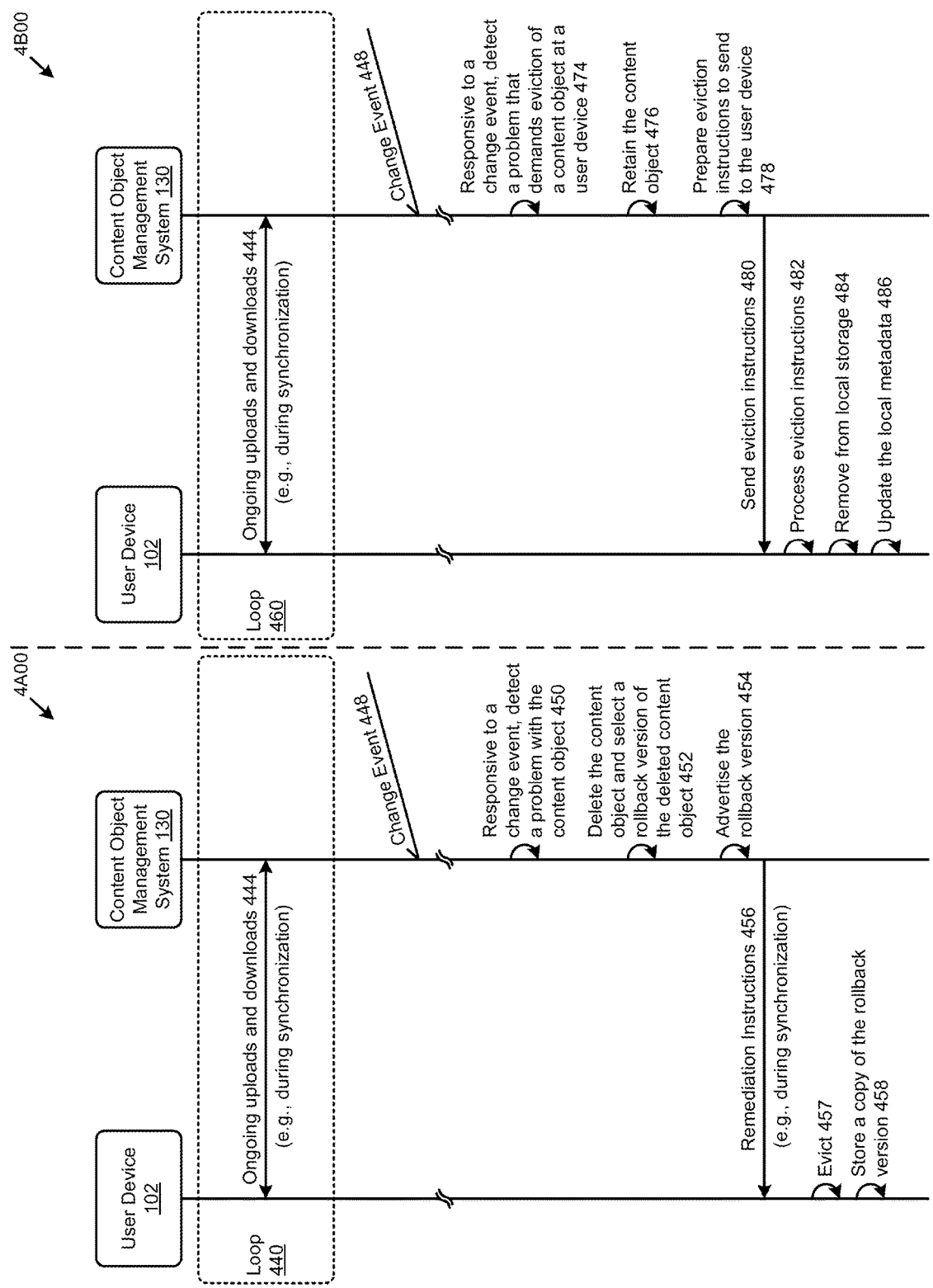
FIG. 4A depicts a malware-handling protocol that implements selective deletion of synchronized content object copies based on malware detection, according to an embodiment.
FIG. 4B depicts an access level enforcement protocol that implements selective deletion of synchronized content object copies based on a security classification change, according to an embodiment.

FIG. 4A depicts a malware-handling protocol that implements selective deletion of synchronized content object copies based on malware detection. As an option, one or more variations of malware-handling protocol 4A00 or any aspect thereof may be implemented in the context of the architecture and functionality of the embodiments described herein and/or in any environment.

The malware-handling protocol 4A00 is carried out by and between user device 102 and content object management system 130. Specifically, a message exchange is carried out whereby various actions at either the user device or the content object management system are initiated in response to detected events and/or messages.

As shown by loop 440, user device 102 and content object management system 130 continually perform ongoing uploads and downloads (bilateral messaging 444). In exemplary situations, the bilateral messaging implements content object synchronization by and between the user device and the content object management system. The shown bilateral messaging may be implemented, at least in part, by execution of synchronization code and/or by the user device that was/is provided by the content object management system.

Strictly as one example of bilateral messaging, execution of the synchronization code might cause the user device to raise a user event. In response to the user event, the cloud-based content object management system might allow (or deny) re-initiation of synchronization between the remote content object copy and the subject content object.

Execution of synchronization code serves to synchronize various forms of information of the cloud-based content object management system with a user device. Strictly as examples, the various forms of information of the cloud-based content object management system can comprise any/all of, content objects, metadata, and/or executable code.

At some moment in time, the content object management system may detect a change event. This is shown as change event 448. Detection of such a change event can happen based on any information available to the content object management system. In some cases, a change event can be detected based on information that derives from administratively-raised changes that are made to user profiles and/or to metadata. In some cases, a change event can be detected based on information that derives from the user device itself. In some cases, a change event can be detected based on information that derives from one or more user devices other than user device 102. For example, in this latter case, it might happen that one or more user devices other than user device 102 are the first to detect a presence of malware, and are the first devices to report such presence to the content object management system.

Irrespective of the source of the information that results in content object management system detection of a change event, the content object management system may respond to the event detection by identifying the nature of the problem to be remediated (operation 450). Determination as to how the particular problem is to be remediated might be based on an incoming event classification and/or a change event type. In the specific case corresponding to this malware-handling protocol, the incoming event classification and/or a change event type corresponds to malware detection. More specifically, based on a determination that the subject content object contains malware, the content object management system will delete the offending malware-infected content object and roll back to a previous uninfected version of the subject content object (operation 452).

Since the content object management system is aware of all registered user devices, and since the content object management system is aware of which of those registered user devices has an infected copy of the subject content object, the content object management system can broadcast remediation instructions to all such user devices (operation 454).

In some cases, and as shown, the remediation instructions 456 include a copy of a rollback version that is used to overwrite the malware-infected version. In other cases, the remediation instructions include merely a suggestion for the user device to evict the malware-infected content object (operation 457) and to request a download of the rollback version. In this case, the user device, in response to the remediation instructions, may choose to download the rollback version. In some cases the choice to download the rollback version may be facilitated by on-screen messaging with the actual human user of the user device. Irrespective of the particular formulation of the remediation instructions, the user device will store a copy of the rollback version (operation 458).

The foregoing scenario is specific to malware-handling where both a content object to be evicted (e.g., a malware-infected content object) as well as a specific replacement (e.g., a rollback version) are instructed to the user device(s). However, there are many scenarios where the remediation instructions do not propose any specific replacement. In many of such scenarios, replacement can be deferred until such time as the user device requests synchronization—if that ever happens. To accommodate a wide variety of scenarios (e.g., access-level enforcement scenarios), the metadata of an evicted content object can be retained at the user device such that the user device can re-initiate synchronization with whatever is the then-current version of the subject content object as stored at the content object management system. Such a resynchronization request might be granted, or such a resynchronization request might be denied, depending on the then-current conditions and/or the then-current relationships between the security level of a content object and the security level ascribed to the user or user device.

FIG. 4B depicts an access level enforcement protocol that implements selective deletion of synchronized content object copies based on a security classification change. As an option, one or more variations of access level enforcement protocol 4B00 or any aspect thereof may be implemented in the context of the architecture and functionality of the embodiments described herein and/or in any environment.

The access level enforcement protocol 4B00 is carried out by and between user device 102 and content object management system 130. Specifically, a message exchange is carried out whereby various actions at either the user device or the content object management system are initiated in response to detected events and/or messages. As shown by loop 460, user device 102 and content object management system 130 continually perform ongoing uploads and downloads (bilateral messaging 444). In exemplary situations, the bilateral messaging implements content object synchronization by and between the user device and the content object management system.

At some moment in time, a change event 448 occurs. Responsive to such a change event, the content object management system determines that there is a problem (e.g., an access level mismatch) that demands eviction of a subject content object at a user device (operation 474). In this embodiment, the content object is retained at the content object management system (operation 476). Eviction instructions are prepared (operation 478) and then sent (message 480) to a target user device. The user device, in response receipt of the eviction instructions (message 480), proceeds to process the eviction instructions (operation 482). In carrying out the eviction, the content object at the user device is removed from device-local storage (operation 484). The metadata at the user device (e.g., an entry or entries in a local directory) is updated (operation 486) to reflect that the eviction and/or removal has been completed.

Resynchronization of the subject content object with an updated copy can be deferred until such time as the user device requests resynchronization—if that ever happens. Such a resynchronization request might be granted, or such a resynchronization request might be denied, depending on the then-current conditions and/or the then-current relationships between the security level of a requested content object and the security level ascribed to the user or user device.

Additional Embodiments of the Disclosure

Instruction Code Examples

Figure 5:
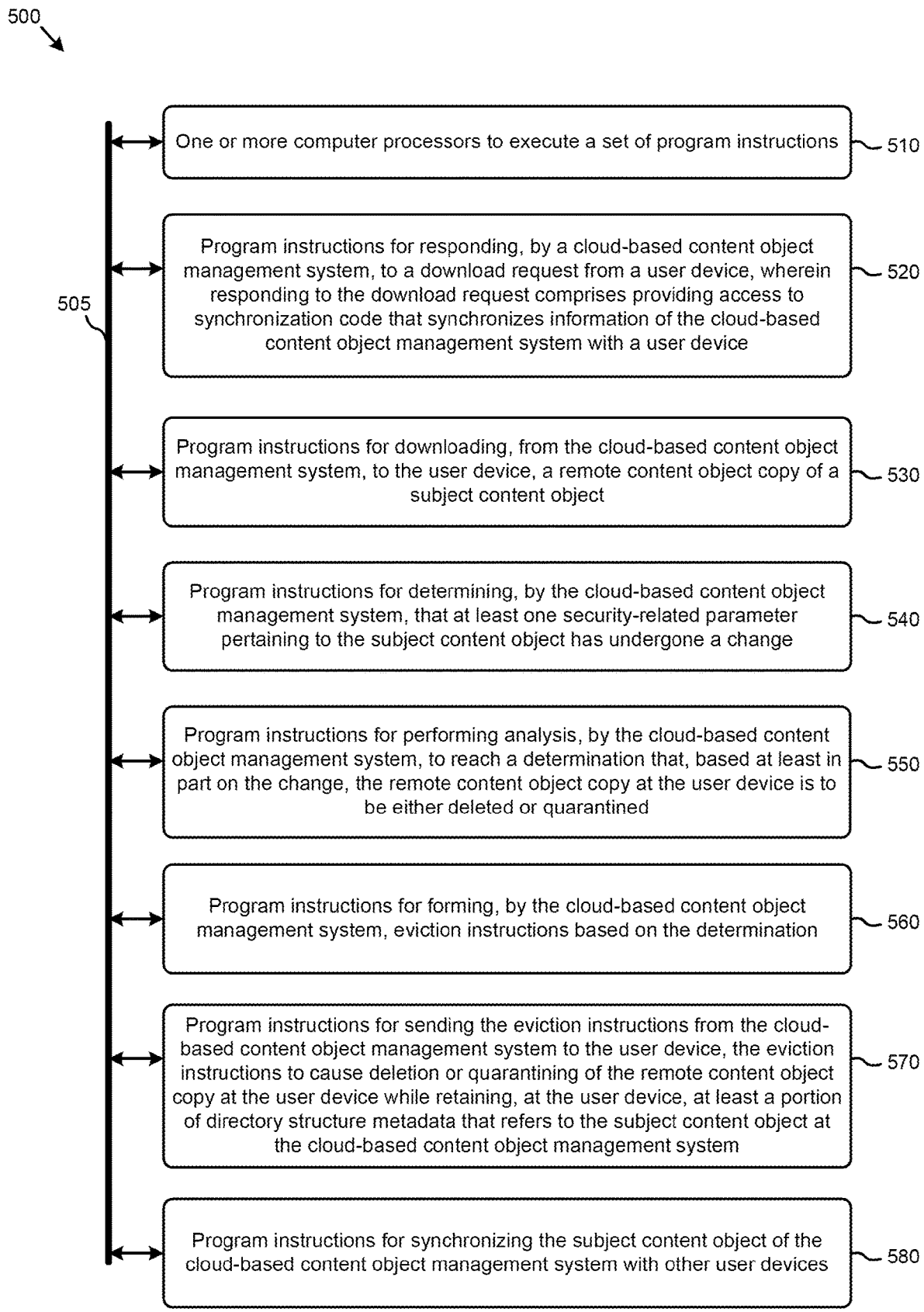
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. This and other embodiments present particular arrangements of elements that, individually or as combined, serve to form improved technological processes that address reducing risk of maintaining distributed copies of shared content objects. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment. The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with any other operations over communication path 505. The modules of the system can, individually or in combination, perform method operations within system 500. Any operations performed within system 500 may be performed in any order unless as may be specified in the claims. The shown embodiment implements a portion of a computer system, presented as system 500, comprising one or more computer processors to execute a set of program code instructions (module 510) and modules for accessing memory to hold program code instructions to perform: responding, by a cloud-based content object management system, to a download request from a user device, wherein responding to the download request comprises providing access to synchronization code that synchronizes information of the cloud-based content object management system with a user device (module 520); downloading, from the cloud-based content object management system, to the user device, a remote content object copy of a subject content object (module 530); determining, by the cloud-based content object management system, that at least one security-related parameter pertaining to the subject content object has undergone a change (module 540); performing analysis, by the cloud-based content object management system, to reach a determination that, based at least in part on the change, the remote content object copy at the user device is to be either deleted or quarantined (module 550); forming, by the cloud-based content object management system, eviction instructions based on the determination (module 560); sending the eviction instructions from the cloud-based content object management system to the user device, the eviction instructions to cause deletion or quarantining of the remote content object copy at the user device while retaining, at the user device, at least a portion of directory structure metadata that refers to the subject content object at the cloud-based content object management system (module 570); and synchronizing the subject content object of the cloud-based content object management system with other user devices (module 580).

Variations of the foregoing may include more or fewer of the shown modules. Certain variations may perform more or fewer (or different) steps and/or certain variations may use data elements in more, or in fewer, or in different operations.

System Architecture Overview

Additional System Architecture Examples

Figure 6A:
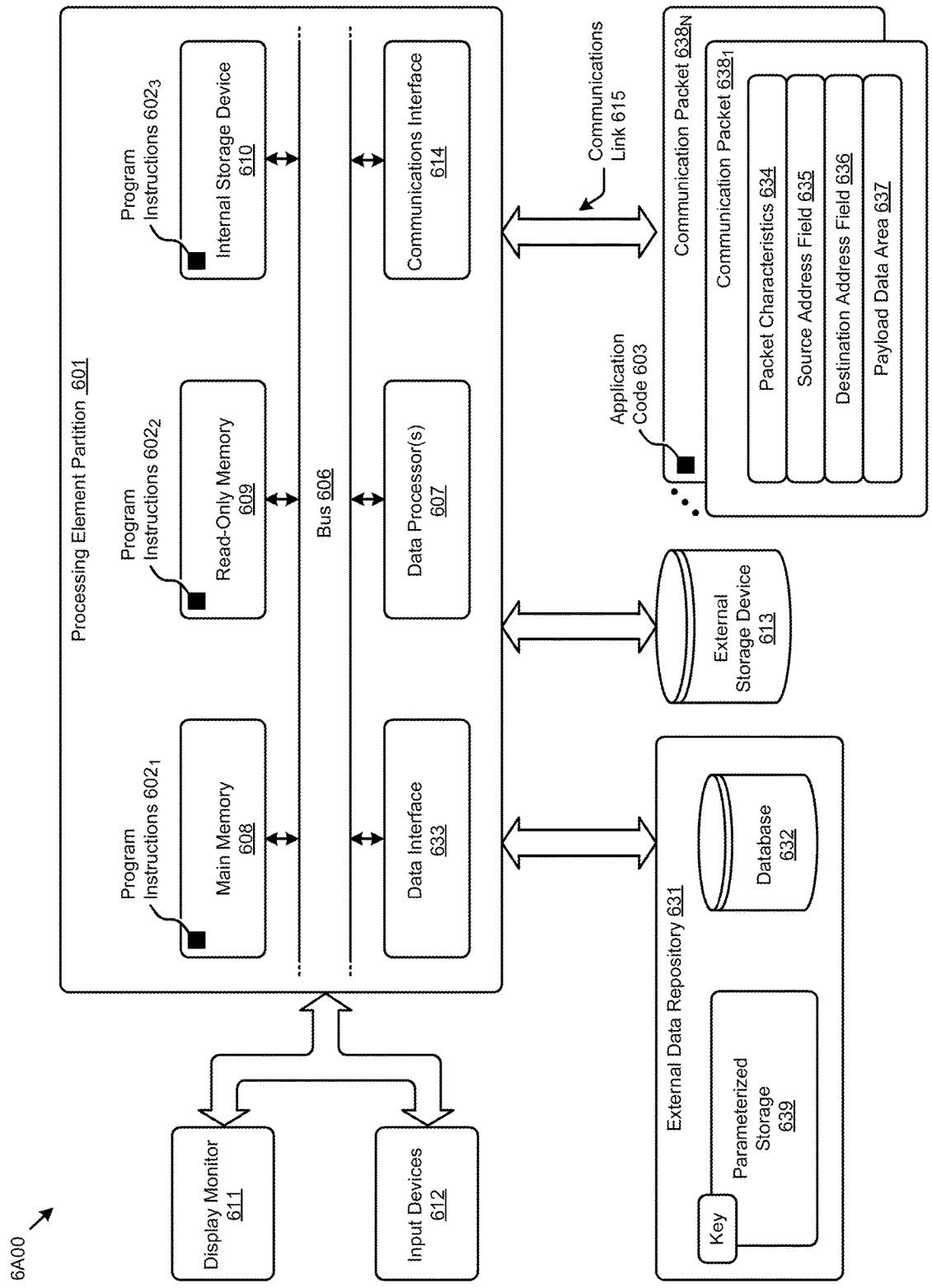
FIG. 6A and FIG. 6B present block diagrams of computer system architectures having components suitable for implementing embodiments of the present disclosure and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. Computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program instructions contained in a memory. Such instructions (e.g., program instructions 602₁, program instructions 602₂, program instructions 602₃, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of communications interface 614 may comprise one or more networking ports that are configurable (e.g., pertaining to speed, protocol, physical layer characteristics, media access characteristics, etc.) and any particular instance of communications interface 614 or port thereto can be configured differently from any other particular instance. Portions of a communication protocol can be carried out in whole or in part by any instance of communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

Communications link 615 can be configured to transmit (e.g., send, receive, signal, etc.) any types of communications packets (e.g., communication packet $638_1$, communication packet 638N) comprising any organization of data items. The data items can comprise a payload data area 637, a destination address 636 (e.g., a destination IP address), a source address 635 (e.g., a source IP address), and can include various encodings or formatting of bit fields to populate packet characteristics 634. In some cases, the packet characteristics include a version identifier, a packet or payload length, a traffic class, a flow label, etc. In some cases, payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of a computer system 6A00. According to certain embodiments of the disclosure, two or more instances of computer system 6A00 coupled by a communications link 615 (e.g., LAN, public switched telephone network, or wireless network) may perform the sequence of instructions required to practice embodiments of the disclosure using two or more instances of components of computer system 6A00.

Computer system 6A00 may transmit and receive messages such as data and/or instructions organized into a data structure (e.g., communications packets). The data structure can include program instructions (e.g., application code 603), communicated through communications link 615 and communications interface 614. Received program instructions may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

Processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to selective deletion of synchronized content object copies based on a detected change. A module may include one or more state machines and/or combinational logic used to implement or facilitate the operational and/or performance characteristics pertaining to methods for selective deletion of synchronized content object copies based on a detected change.

Various implementations of database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of selective deletion of synchronized content object copies based on a detected change). Such files, records, or data structures can be brought into and/or stored in volatile or non-volatile memory.

Figure 6B:
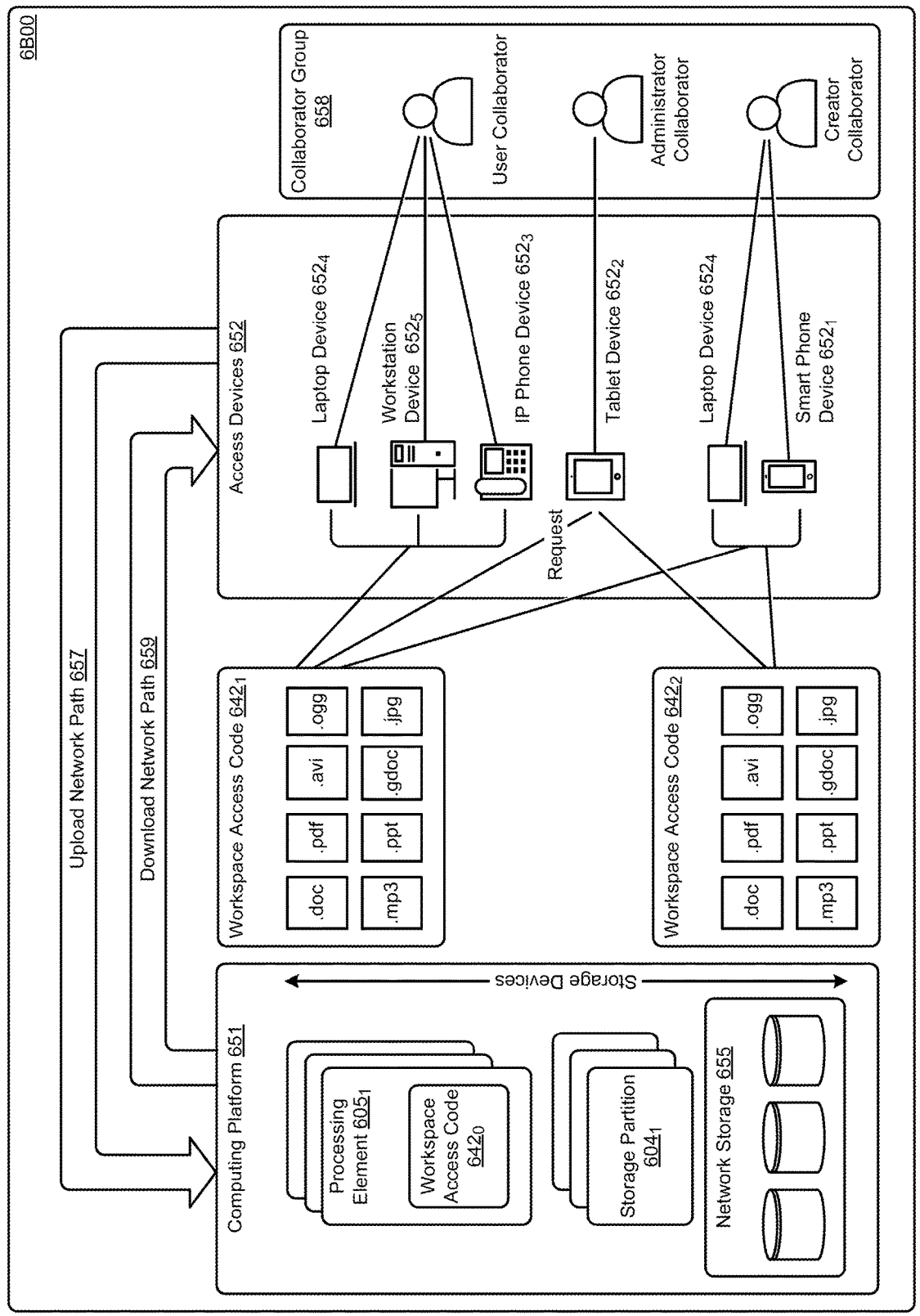

FIG. 6B depicts a block diagram of an instance of a cloud-based environment 6B00. Such a cloud-based environment supports access to workspaces through the execution of workspace access code (e.g., workspace access code $642_0$, workspace access code $642_1$, and workspace access code $642_2$). Workspace access code can be executed on any of access devices 652 (e.g., laptop device 652₄, workstation device 652₅, IP phone device 652₃, tablet device 652₂, smart phone device 652₁, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 651, including in a middleware setting. As shown, a portion of the workspace access code resides in and can be executed on one or more processing elements (e.g., processing element 605₁). The workspace access code can interface with storage devices such as networked storage 655. Storage of workspaces and/or any constituent files or objects, and/or any other code or scripts or data can be stored in any one or more storage partitions (e.g., storage partition 604₁). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    responding, by a cloud-based content object management system, to a download request from a user device, wherein responding to the download request comprises providing access to synchronization code that synchronizes information of the cloud-based content object management system with a user device;
    downloading, from the cloud-based content object management system, to the user device, a remote content object copy of a subject content object;
    determining, by the cloud-based content object management system, that at least one security-related parameter pertaining to the subject content object has undergone a change;
    performing analysis, by the cloud-based content object management system, to reach a determination that, based at least in part on the change, the remote content object copy at the user device is to be either deleted or quarantined;
    forming, by the cloud-based content object management system, eviction instructions based on the determination;
    sending the eviction instructions from the cloud-based content object management system to the user device, the eviction instructions to cause deletion or quarantining of the remote content object copy at the user device while retaining, at the user device, at least a portion of directory structure metadata that refers to the subject content object at the cloud-based content object management system; and
    synchronizing the subject content object of the cloud-based content object management system with other user devices.

2. The method of claim 1, further comprising, responding to a synchronization request raised by the user device to synchronize the remote content object copy with the subject content object by denying the synchronization request.

3. The method of claim 1, further comprising: responding to a user event raised by the user device by allowing re-initiation of synchronization between the remote content object copy and the subject content object.

4. The method of claim 3, wherein the re-initiation of synchronization the remote content object copy commences in response to a change in a network path between the cloud-based content object management system and the user device.

5. The method of claim 3, further comprising: responding to a user event pertaining to the directory structure metadata by denying re-initiation of synchronization of the remote content object copy at the user device with the subject content object at the cloud-based content object management system.

6. The method of claim 1, further comprising: re-initiation of synchronization of the remote content object copy at the user device with a previous version of the subject content object at the cloud-based content object management system.

7. The method of claim 1, further comprising: initiating synchronization of the at least a portion of the directory structure metadata pertaining to the remote content object copy at the user device with metadata pertaining to a previous version of the subject content object at the cloud-based content object management system.

8. The method of claim 7, further comprising: synchronizing the subject content object in the cloud-based content object management system with a different user device.

9. The method of claim 8, wherein maintaining the subject content object in the cloud-based content object management system comprises forming a limited use boundary around a copy of the subject content object.

10. A non-transitory computer readable medium having stored thereon a sequence of instructions which, when stored in memory and executed by one or more processors causes the one or more processors to perform a set of acts, the set of acts comprising:

responding, by a cloud-based content object management system, to a download request from a user device, wherein responding to the download request comprises providing access to synchronization code that synchronizes information of the cloud-based content object management system with a user device;

downloading, from the cloud-based content object management system, to the user device, a remote content object copy of a subject content object;

determining, by the cloud-based content object management system, that at least one security-related parameter pertaining to the subject content object has undergone a change;

performing analysis, by the cloud-based content object management system, to reach a determination that, based at least in part on the change, the remote content object copy at the user device is to be either deleted or quarantined;

forming, by the cloud-based content object management system, eviction instructions based on the determination;

sending the eviction instructions from the cloud-based content object management system to the user device, the eviction instructions to cause deletion or quarantining of the remote content object copy at the user device while retaining, at the user device, at least a portion of directory structure metadata that refers to the subject content object at the cloud-based content object management system; and synchronizing the subject content object of the cloud-based content object management system with other user devices.

11. The non-transitory computer readable medium of claim 10, further comprising instructions which, when stored in memory and executed by the one or more processors causes the one or more processors to perform acts of, responding to a synchronization request raised by the user device to synchronize the remote content object copy with the subject content object by denying the synchronization request.

12. The non-transitory computer readable medium of claim 10, further comprising instructions which, when stored in memory and executed by the one or more processors causes the one or more processors to perform acts of: responding to a user event raised by the user device by allowing re-initiation of synchronization between the remote content object copy and the subject content object.

13. The non-transitory computer readable medium of claim 12, wherein the re-initiation of synchronization the remote content object copy commences in response to a change in a network path between the cloud-based content object management system and the user device.

14. The non-transitory computer readable medium of claim 12, further comprising instructions which, when stored in memory and executed by the one or more processors causes the one or more processors to perform acts of: responding to a user event pertaining to the directory structure metadata by denying re-initiation of synchronization of the remote content object copy at the user device with the subject content object at the cloud-based content object management system.

15. The non-transitory computer readable medium of claim 10, further comprising instructions which, when stored in memory and executed by the one or more processors causes the one or more processors to perform acts of: re-initiation of synchronization of the remote content object copy at the user device with a previous version of the subject content object at the cloud-based content object management system.

16. The non-transitory computer readable medium of claim 10, further comprising instructions which, when stored in memory and executed by the one or more processors causes the one or more processors to perform acts of: initiating synchronization of the at least a portion of the directory structure metadata pertaining to the remote content object copy at the user device with metadata pertaining to a previous version of the subject content object at the cloud-based content object management system.

17. The non-transitory computer readable medium of claim 16, further comprising instructions which, when stored in memory and executed by the one or more processors causes the one or more processors to perform acts of: synchronizing the subject content object in the cloud-based content object management system with a different user device.

18. The non-transitory computer readable medium of claim 17, wherein maintaining the subject content object in the cloud-based content object management system comprises forming a limited use boundary around a copy of the subject content object.

19. A system comprising:
a storage medium having stored thereon a sequence of instructions; and
one or more processors that execute the sequence of instructions to cause the one or more processors to perform a set of acts, the set of acts comprising,
responding, by a cloud-based content object management system, to a download request from a user device, wherein responding to the download request comprises providing access to synchronization code that synchronizes information of the cloud-based content object management system with a user device;
downloading, from the cloud-based content object management system, to the user device, a remote content object copy of a subject content object;
determining, by the cloud-based content object management system, that at least one security-related parameter pertaining to the subject content object has undergone a change;
performing analysis, by the cloud-based content object management system, to reach a determination that, based at least in part on the change, the remote content object copy at the user device is to be either deleted or quarantined;
forming, by the cloud-based content object management system, eviction instructions based on the determination;
sending the eviction instructions from the cloud-based content object management system to the user device, the eviction instructions to cause deletion or quarantining of the remote content object copy at the user device while retaining, at the user device, at least a portion of directory structure metadata that refers to the subject content object at the cloud-based content object management system; and
synchronizing the subject content object of the cloud-based content object management system with other user devices.

20. The system of claim 19, further comprising, responding to a synchronization request raised by the user device to synchronize the remote content object copy with the subject content object by denying the synchronization request.

* * * * *